United States Patent
Bouet et al.

(10) Patent No.: US 7,068,621 B2
(45) Date of Patent: Jun. 27, 2006

(54) METHOD IN SHORT RANGE RF COMMUNICATION

(75) Inventors: Stephane Bouet, Tokyo (JP); Leonard Yong, Eltham (AU)

(73) Assignee: Nokia Corporation, Espoo (FI)

( * ) Notice: Subject to any disclaimer, the term of this patent is extended or adjusted under 35 U.S.C. 154(b) by 979 days.

(21) Appl. No.: 09/996,627

(22) Filed: Nov. 28, 2001

(65) Prior Publication Data

US 2002/0080866 A1    Jun. 27, 2002

(30) Foreign Application Priority Data

Nov. 30, 2000   (FI)   ................................. 20002637

(51) Int. Cl.
*H04Q 7/00*   (2006.01)
*H04J 3/24*   (2006.01)

(52) U.S. Cl. ...................... 370/328; 370/338; 370/349; 455/517

(58) Field of Classification Search ................ 370/252, 370/256, 328, 329, 338, 346, 349, 351, 401, 370/408, 395.41, 395.42, 395.43
See application file for complete search history.

(56) References Cited

U.S. PATENT DOCUMENTS

| | | | | |
|---|---|---|---|---|
| 5,815,811 A * | 9/1998 | Pinard et al. | ............... | 455/434 |
| 5,960,344 A | 9/1999 | Mahany | .................... | 455/432 |
| 6,400,702 B1 * | 6/2002 | Meier | ........................ | 370/338 |
| 6,470,189 B1 * | 10/2002 | Hill et al. | ................... | 455/517 |
| 6,574,266 B1 * | 6/2003 | Haartsen | .................... | 375/133 |
| 6,680,923 B1 * | 1/2004 | Leon | .......................... | 370/328 |
| 6,697,375 B1 * | 2/2004 | Meng | ......................... | 370/465 |
| 2002/0196771 A1 * | 12/2002 | Vij et al. | .................... | 370/349 |
| 2004/0170154 A1 * | 9/2004 | Carter et al. | ................ | 370/338 |

FOREIGN PATENT DOCUMENTS

| | | |
|---|---|---|
| EP | 0771127 A3 | 5/1997 |
| EP | 0831663 A2 | 3/1998 |
| WO | WO 00/18025 | 3/2000 |

* cited by examiner

*Primary Examiner*—Afsar Qureshi
(74) *Attorney, Agent, or Firm*—Perman & Green, LLP.

(57) ABSTRACT

The invention concerns a method of communicating between an access point (20) of a short range rf network and a user terminal (10) of the short range rf network. The method comprises using a first short range rf transceiver (104) at the access point for access communication with a user terminal (10) for communicating information relating to establishment of a connection with the user terminal (10), and using a second short range rf transceiver (106) at the access point for user data communication for communicating user data with the user terminal.

48 Claims, 10 Drawing Sheets

METHOD IN SHORT RANGE RF COMMUNICATION

BACKGROUND OF THE INVENTION

1. Field of the Invention

This invention relates to the field of communications and, more precisely of short range RF communication between transceivers.

2. Description of Related Art

Recently, low power RF systems have been proposed for providing communications between a plurality of transceivers through a short-range communications link. One such short-range RF technology is currently under development and is referred to as "Bluetooth". This system will be commercially available in the near future and it operates in the open spectrum around 2.45 GHz. This unlicensed radio band, called Industrial, Scientific, Medical (ISM) band is globally available. The operating range of this RF system is approximately 10 meters for a normal power mode and has proven to be economically efficient. It is planned that a Bluetooth chip having these characteristics will be inserted in all kinds of electrical devices for enabling communication between separate devices. In publication WO 00/18025, such a Bluetooth link between a Bluetooth enabled mobile terminal and a Bluetooth enabled data terminal, such as a PC, is disclosed.

Bluetooth technology suffers from a relatively small bandwidth, which is the unavoidable downside of the technological choices that have been made to ensure very low cost implementation. It would be therefore very important to structure the usage of this limited bandwidth so, that performance does not degrade below a level where it is not practical to use Bluetooth technology anymore. This is especially crucial for point to multipoint communication patterns, where several client terminals are connected to a single service provider terminal (that is usually fixed). The Bluetooth standards as described in the Bluetooth specifications do not offer any solutions to this bandwidth depletion problem. When there are several devices to page, the paging protocols use a significant part of available bandwidth diminishing the available bandwidth for content delivering between client device(s) and the fixed device. This diminishing bandwith leads to slower data transfer rates in the Bluetooth link making the Bluetooth link more inefficient.

The same applicant also has U.S. patent application Ser. No. 09/614,508 filed on Jul. 11, 2000 that discloses Bluetooth beacons (access points) having three or more Bluetooth transceiver modules for communicating with other access points or hosts for forming a Bluetooth network. This is for forming a path between a host and the terminal via e.g. three access points, but the application takes no standpoint on increasing user data transmission rates between an access point and a user terminal.

SUMMARY OF THE INVENTION

It is therefore an object of this invention to present a system and method for alleviating this problem of limited bandwidth and enhancing efficiency in transferring data in short range, preferably Bluetooth, connections by separating the task of inquiring and retrieving link and services information from the rest of the data transmissions by using at least two separate Bluetooth modules in a single terminal, each of the modules being used for a separate function relating to a connection.

According to a first aspect of the invention there is provided a method of communicating between an access point of a short range rf network and a user terminal of the short range rf network, characterised in that the method comprises:

using a first short range rf transceiver at the access point for access communication with a user terminal for communicating information relating to establishment of a connection with the user terminal, and using a second short range rf transceiver at the access point for user data communication for communicating user data with the user terminal.

In a first embodiment of the invention an access point of a short range rf communication system is provided with two short range rf transceivers, where a first short range transceiver is used for communicating information relating to establishment of a connection with a user terminal of the short range communication system, and where a second short range transceiver is used for communicating user data to and from the user terminal.

In practice the second transceiver needs to establish a connection before it can start to communicate user data. However, this connection from the second transceiver can be established very quickly because all the necessary information (e.g. in Bluetooth the Bluetooth address, clock offset, information on the services that are supported etc) for a connection exists and is transferred from the first transceiver to the second transceiver before the second transceiver establishes a connection and starts to communicate user data.

In a further embodiment the second short range transceiver is dedicated to communicating user data only, and the first short range transceiver is also used for ending connections.

In yet another embodiment communication between the access point and the user terminal is time division multiplex where transmission between an access point and a user terminal is done by transmitting a burst in a specified time slot. Preferably, the first and the second short range transceivers of the access point use different frequencies.

The present invention increases user data transmission rate and user data transmission capacity as bandwidth and thus transmission capacity is normally consumed by inquiries in relation to establishing a connection. User data transmission capacity especially increases compared to prior solutions in a busy environment where many user terminals enter and leave the coverage area of the access point, whereby a lot of inquiry communication occurs.

The at least two Bluetooth modules have separate baseband addresses and the operations of these modules are independent of each other. The first module is dedicated to inquiries and service database requests and it is discoverable and connectable to other Bluetooth enabled devices. The second module is dedicated to user data transport and is non-discoverable and non-connectable to other Bluetooth enabled devices. After the necessary inquiries and service protocols are executed, the first module transfers the needed information to the second Bluetooth module, which can start communicating with other Bluetooth enabled devices using the received information.

According to the present invention a method to transmit a signal from a first terminal able to communicate wirelessly with a second terminal is described comprising the steps of said first terminal including at least a first transceiver module and at least a second transceiver module, establishing a first communication link between the second terminal and the first transceiver module of the first terminal, a communication bus between the first transceiver module of the first terminal and a second transceiver module for transferring information from the first communication between the second terminal and the first transceiver module of the first terminal, establishing a second communication link between the second transceiver module and the second terminal identified by the information received from the first transceiver module, respectively.

Further according to an embodiment of the invention the first and the second transceiver modules have predetermined functions. The first transceiver module makes inquiries and transfers information from the terminal to the second transceiver so that the first terminal from its second transceiver module may contact the second terminal in order to deliver the data to the second terminal. The above method makes it possible of enhancing efficiency on data transfer between the nodes.

Further according to an embodiment the invention includes a method of enhancing efficiency in data transfer, said method comprising the steps of:

a user terminal approaching an access point, said terminal including at least one transceiver communicable with a at least one transceiver of the access point, discovering the user terminal, identifying the user terminal by the access point by a first transceiver module of the access point and establishing a first link between the user terminal and the first transceiver module of the access point, respectively transferring information collected in the previous step from the first transceiver module to a second transceiver module of the access point, disconnecting the connection between the user terminal and the first transceiver module, connecting a second link between the second transceiver module of the access point and the user terminal utilizing the identification information of the user terminal received from the first transceiver module, transferring content to the user terminal taking into consideration the capabilities of the user terminal received from the first transceiver module.

According to a second aspect of the invention there is provided a short range rf communication system comprising an access point of a short range rf network and a user terminal of the short range rf network. Also according to a third aspect of the invention there is provided an apparatus such as an access point. The communication system and the apparatus are both characterised in that the apparatus or access point comprises:

a first short range rf transceiver for access communication with a user terminal for communicating information in relation to establishment of a connection with the user terminal, and a second short range rf transceiver for user data communication for communicating user data with the user terminal.

Furthermore, according to an embodiment of the present invention the first and second communication links are wireless short range RF links e.g. Bluetooth links, thus enabling the utilization of unlicensed bandwidth.

Furthermore, according to an embodiment of the present invention the transceivers are short-range transceiver modules that have separate baseband addresses and the operations of these modules are independent of each other. Thus the load of the each module is limited and shared.

Furthermore, according to an embodiment of the present invention the received information by the first transceiver module comprises baseband address of the user terminal, clock offset information and supported services information, thus enabling that the first transceiver can transmit information needed for making contact to the terminal which requested the content.

Furthermore, according to an embodiment of the present invention the user terminal is one of a mobile phone, a personal digital assistant, a gamepad and a computer.

Furthermore, according to an embodiment of the present invention a system of enhancing efficiency in data transfer is described, said system comprises; a user terminal capable of communicating over rf with an access point, discovering means for discovering the user terminal, identifying means for identifying the user terminal by the access point by a first transceiver module of the access point, means for establishing a first communication link between the user terminal and the first transceiver module of the access point, a communication bus between the first transceiver module and a second transceiver module for transferring information, means for establishing a second communication link between the second transceiver module and the user terminal identified by the information received from the first transceiver module, respectively.

Furthermore, according to an embodiment of the present invention there is provided a system for transmitting a signal from a first terminal able to communicate wirelessly with a second terminal, the system comprising said first terminal including at least a first transceiver module and at least a second transceiver module, means for establishing a first communication link between the second terminal and the first transceiver module of the first terminal, a communication bus between the first transceiver module of the first terminal and a second transceiver module for transferring information from the communication between the second terminal and the first transceiver module of the first terminal, means for establishing a second communication link between the second transceiver module and the second terminal identified by the information received from the first transceiver module, respectively.

Furthermore, according to an embodiment of the present invention the first and second transceiver modules have separate baseband addresses and operate independently of each other.

Furthermore, according to an embodiment of the present invention the information transferred between the first and the second transceiver module (via a communication bus) includes user terminal specific identification information, which includes baseband address of the terminal, clock offset information of the terminal, Bluetooth class of the terminal, supporting services information of the terminal.

Furthermore, according to an embodiment of the present invention there is provided an apparatus for communicating wirelessly with another terminal, said apparatus comprising a first transceiver module, a second transceiver module, a communication bus between the first transceiver module and the second transceiver module, switches in the first and second module for connecting and disconnecting a link between the another terminal and the first transceiver and second transceiver modules, respectively.

According to yet another embodiment of the invention, the function of the at least two short range rf transceiver units is dynamically controlled so that none of the modules are strictly fixed merely for communication relating to accessing the access point nor strictly for communication of user data, but a module can be used either for communication relating to accessing the access point or for communication of user data depending on the situation. An optimized way of handling short range rf network access points with at least two modules is to specialise the modules for specific use according to the invention. This embodiment is especially feasible when a plurality of transceiver modules are used. For example, the access point includes five transceiver modules, whereby at one instance one module is used for communication relating to the user terminals accessing the access point, and four modules are used for communication of user data, but at another instance two modules are used for communication relating to the user terminals accessing the access point, and three modules are used for communication of user data.

Especially the Bluetooth protocol is written in such a way that communication relating to access to the medium (access to a Bluetooth piconet) and communication of user data (i.e. the interactions with a piconet) are very distinct procedures that can be carried out independent of each other. This makes it possible to use specialised Bluetooth transceiver modules within the access point, separate module(s) for medium access control type of activities and separate module(s) for user data transport. In case of sudden peak in the number of user terminal devices trying to connect to the access point, it could still overflow when the function of each transceiver module is fixed.

Therefore, according to the above described further embodiment the function of each transceiver module in the access point can be dynamically controlled.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figure 1:
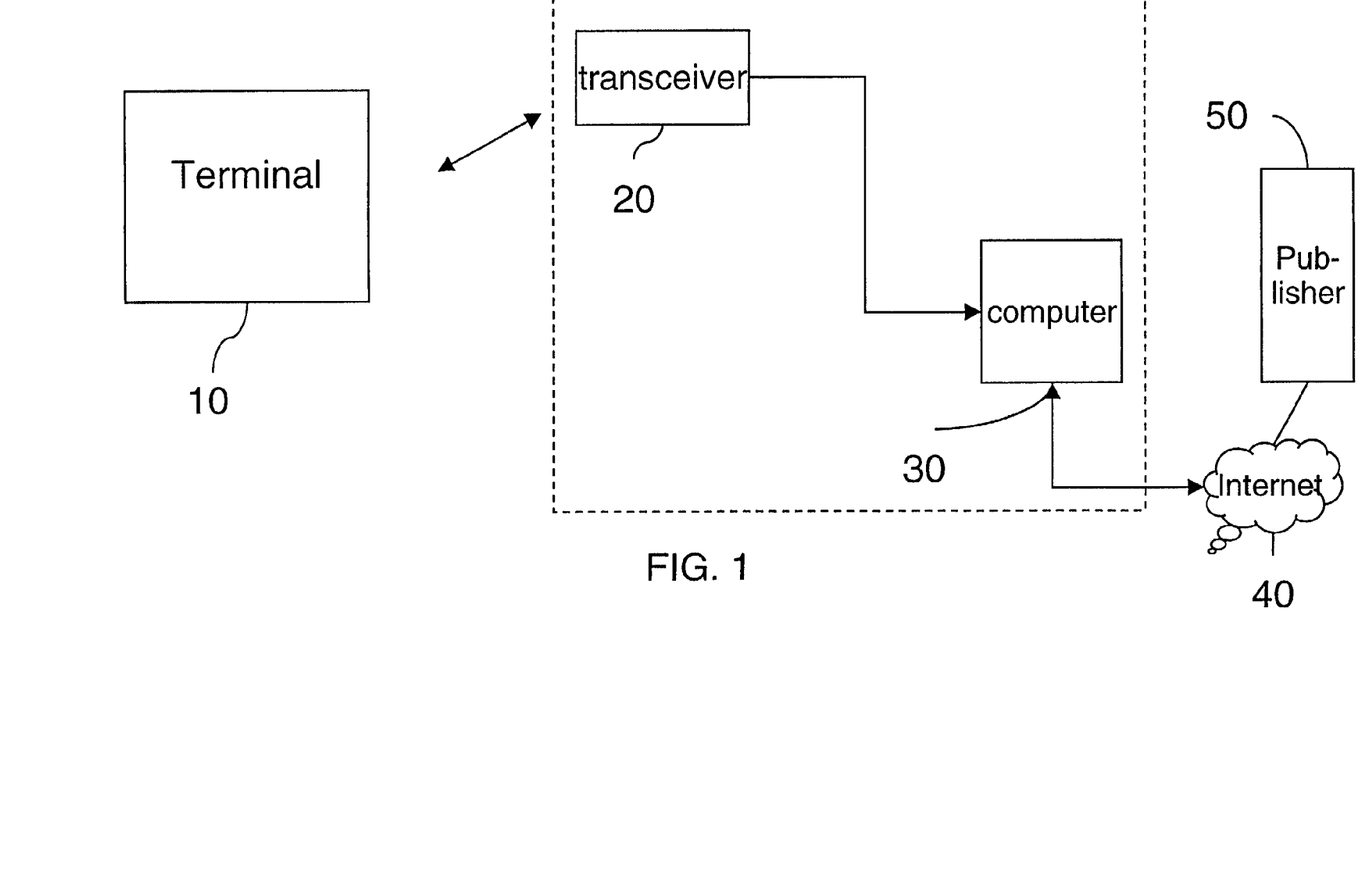
FIG. 1 is a schematic representation of one embodiment of the invention.

FIG. 1 is a schematic representation of the environment of this invention. FIG. 1 describes an environment where a large number of Bluetooth enabled devices 10 (e.g. clients visiting shopping centers having the Bluetooth access points) come and go in and out of the Bluetooth coverage zone of a fixed device, i.e. the access point 20 to various services. FIG. 1 discloses a wireless communication system between a terminal 10 and an access point 20. The access point 20 may contain information transferable to the terminal 10 or it can be connected to a computer 30 having information transferable to the terminal. Further the computer 30 may be connected to the Internet 40. The Internet 40 represents a computer network, which can be accessed by different user terminals and also by a service or content provider. For example the service provider, such as a publisher 50, is connected to the Internet 40.

Figure 2:
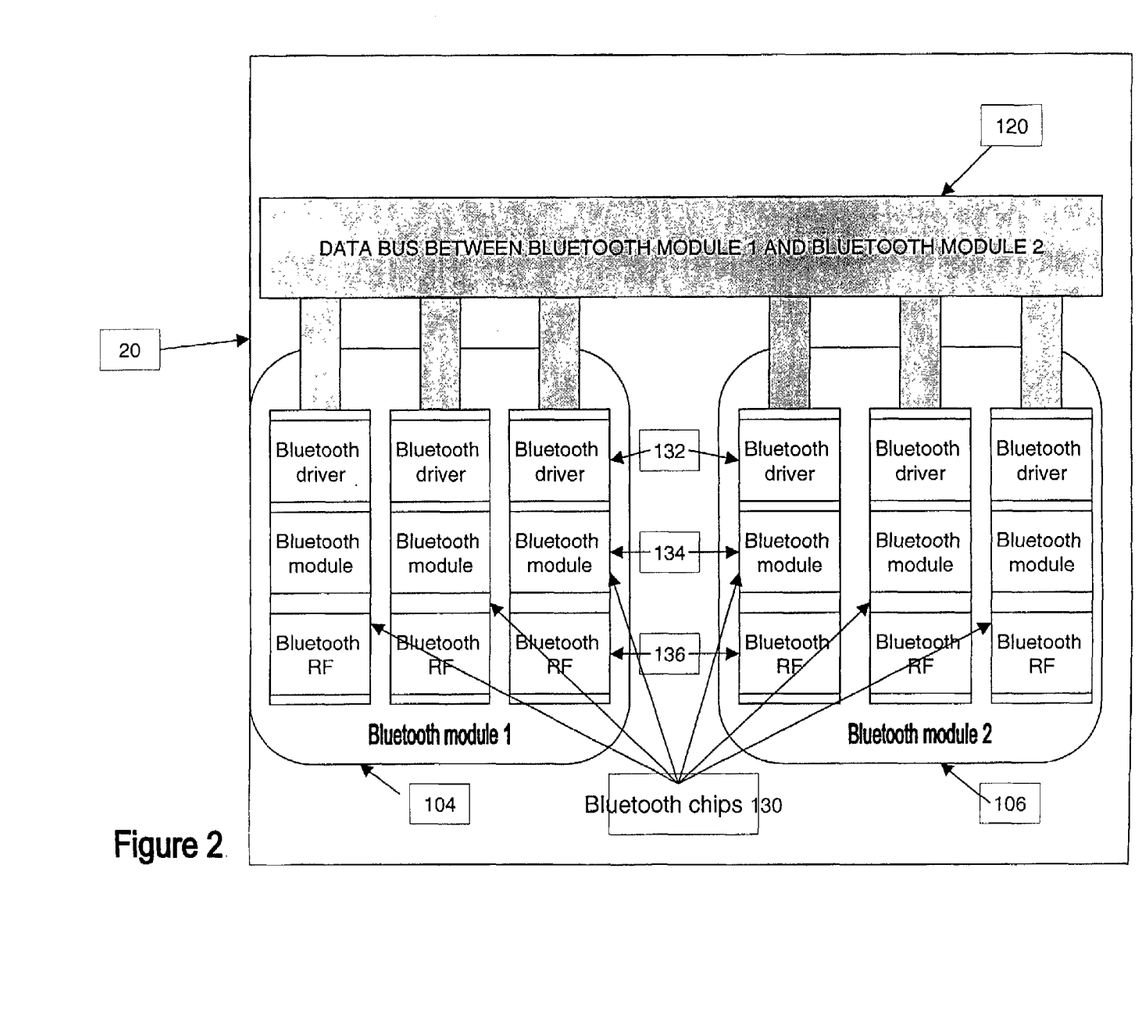
FIG. 2 illustrates the two separate Bluetooth modules with specialised roles in a single device according to one embodiment of the invention.

According to one embodiment of the invention, as shown in FIG. 2, the access point 20 includes at least a first transceiver module 104 and a second transceiver module 106. A first communication link 118 (see FIG. 5) is established between the user terminal device 10 and the first transceiver module 104 of the access point 20. There is a communication bus 120 between the first transceiver module 104 and the second transceiver module 106 for transferring information from the communication between the user terminal 10 and the first transceiver module 104 of access point 20. A communication link between the second transceiver module 106 and the user terminal 10 is established based on the information received from the first transceiver module 104, respectively. It will be understood that the number of the transceiver modules may differ according to the needs of the specific site, i.e. based on e.g. how many user terminals the access point is designed to support.

Figure 3A:
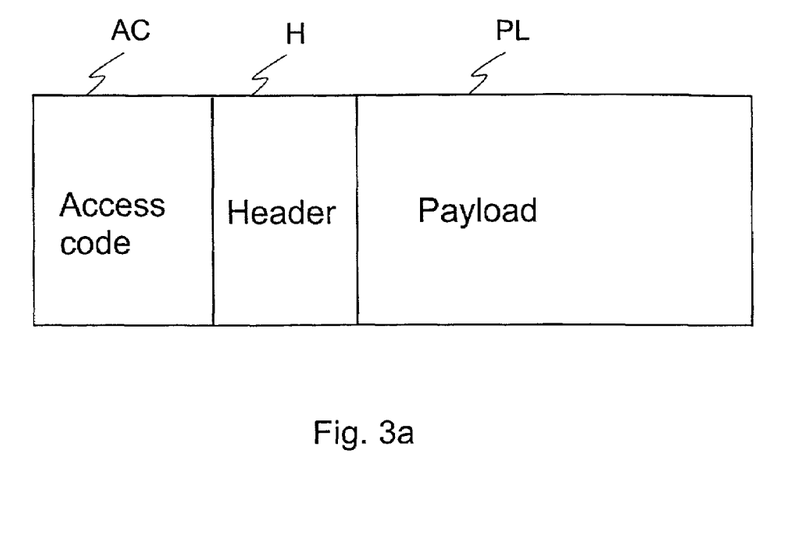
FIG. 3a illustrates the structure of a Bluetooth data packet.

According to the Bluetooth specifications the physical radio link can work on 79 different frequencies, on 2400–2483.5 MHz by steps of 1 MHz. The transmission is time division based, i.e. in time slots of length 625 µs. FIG. 3a illustrates the frame structure of a Bluetooth packet that is transmitted in a time slot, whereby there is first an access code field AC, a header field H and a payload field PL. The contents of the access code AC and header H fields are explained in detail in the Bluetooth specifications. The payload field includes coding and a body portion, where when used for inquiries the body portion includes different data needed for the inquiry (defined more closely in the Bluetooth specifications), and when used for transmission of user data, the body portion includes the user data.

Figure 3B:
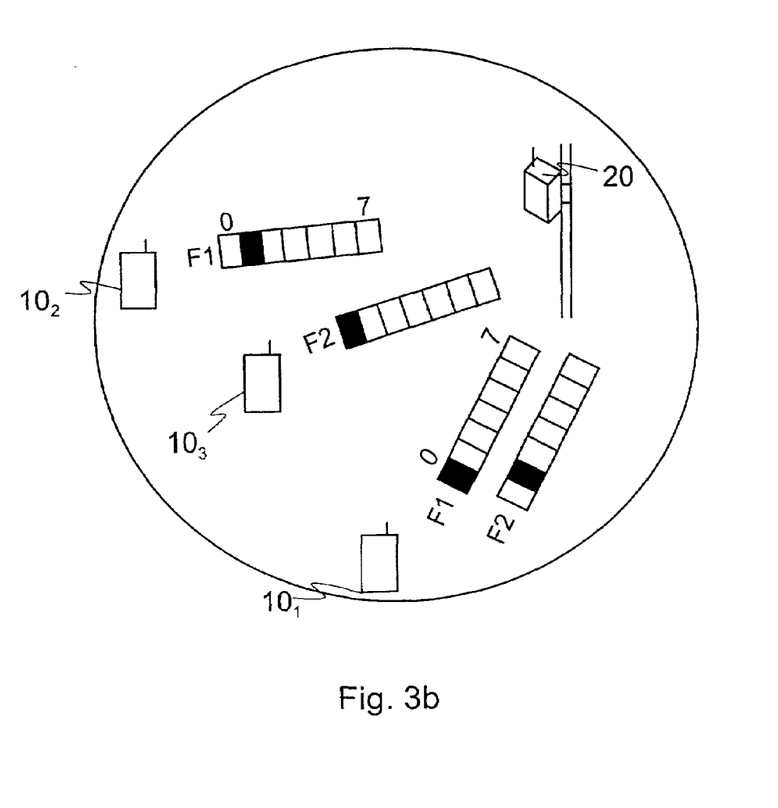
FIG. 3b illustrates the separation of transmission according to the invention.

In the present invention there is preferably used a different frequency for transmissions from the first transceiver module 104 than for transmissions from the second transceiver module 106. Accordingly according to the present invention the access point 20 can increase its capacity of communicating user data as the first transceiver module 104 is used for communicating information relating to establishing a connection between a user terminal 10 and the access point 20, and the second transceiver module 106 is used primarily for communication of user data. In a one embodiment the second transceiver module 106 is used only for communication of user data. Thereby when a big number of user terminals 10 enter and leave the coverage area of the access point 20, the first transceiver module 104 handles the inquiries and the second transceiver module 106 handles transmission of user data. This increases the capacity of user data transmission that the access point is able to handle since the inquiries do not consume bandwidth of user data transmissions as according to the invention the inquiries of different user terminals 10 can be handled at the same time by the first transceiver module 104 as the second transceiver module 106 handles communication of user data with the different user terminals. This is illustrated in FIG. 3b wherein the access point 20 communicates inquiries on a first frequency F1 with a first user terminal $10_1$ in time slot 0, and communicates inquiries on the frequency F1 with a second user terminal $10_2$ in time slot 1. User data is communicated with a third user terminal $10_3$ on a second frequency F2 in time slot 0 and with the first user terminal $10_1$ on frequency F2 in time slot 1. The user terminals $10_1$, $10_2$ and $10_3$ have only one short range transceiver and are not able to handle inquiries and user data transmission simultaneously, so the access point 20 handles simultaneously access communication (inquiries) and transmission of user data of two different user terminals (so not of the same user terminal). The second user terminal $10_2$ uses frequency hopping in switching from frequency F1 in time slot 0 to frequency F2 in time slot 1.

Figure 4:
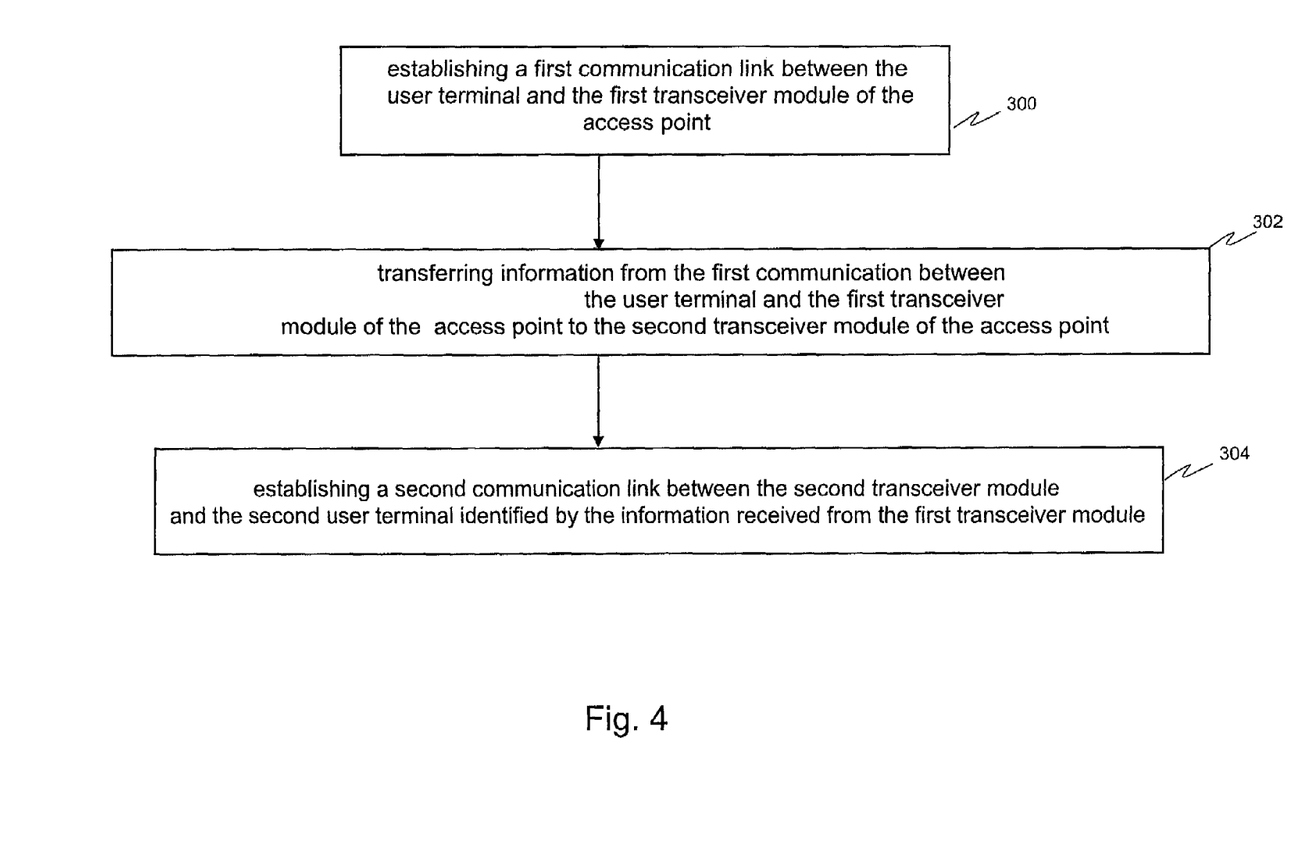
FIG. 4 depicts an embodiment of the method of the invention.

FIG. 4 discloses a flowchart of a method to transmit a signal from a first terminal (such as the access point 20) able to communicate wirelessly with a second terminal (such as the user terminal). In the first step 300 the access point 20 including at least a first transceiver module 104 and at least a second transceiver module 106, establishes a first communication link 118 between the user terminal 10 and the first transceiver module 104 of the access point 20. In step 302 information is transferred on the first communication between the user terminal 10 and the first transceiver module 104 of the access point through the communication bus 120 between the first transceiver module 104 and a second transceiver module 106. In step 304 a second communication link 122 is established between the second transceiver module 106 (of the access point 20) and the user terminal 10 identified by the information received from the first transceiver module 104, respectively.

According to the invention the first and the second transceiver module 104 and 106 both have their own function, that is in one embodiment fixedly predetermined and the first and the second modules have different functions. The first transceiver module 104 makes inquiries and transfers information received from the user terminal 10 to the second transceiver module 106 so that the access point 20 via its second transceiver module 106 may contact the user terminal 10 in order to deliver the data to the user terminal 10. The above method makes it possible of enhancing efficiency on data transfer between the nodes as access communication does not consume bandwidth of user data communication (since they are handled by separate transceiver modules).

However, in another embodiment the function of each transceiver module 104, 106 is dynamically controlled, whereby the function of a specific transceiver module can be switched from access communication to user data communication and vice versa.

Returning to FIG. 2 it shows the principle of how the two separate Bluetooth modules 104, 106 with specialized roles are integrated in a single device. Inquiries, Service Discovery Protocols (SDP) and Link Manager Protocol (LMP) are handled in Bluetooth module one 104 (the first transceiver module) and RFCOMM (discussed in the Bluetooth Specification) and other user data related traffics are handled in Bluetooth module two 106 (the second transceiver module). In FIG. 2 Bluetooth module one 104 and Bluetooth module two 106 each include three separate semiconductor chips 130, but the number of chips may be anything from one to any number, depending on the need basis. One chip 130 can communicate with seven other chips simultaneously. Each chip 130 comprises a driver part 132, a module part 134 and an RF part 136, as is known to a person skilled in the art regarding the implementation of a Bluetooth chip. According to the invention there are two operationally separate Bluetooth modules 104 and 106, Bluetooth module one 104 and Bluetooth module two 106. The modules 104 and 106 have separate baseband addresses allowing the modules 104 and 106 to operate independently and fulfilling the necessary communication together. Also the functionality could be implemented, although not necessarily, so that module one 104 is discoverable by an external device and connectable to other Bluetooth enabled devices 20, and module two 106 is non-discoverable and non-connectable to other Bluetooth enabled devices 20, so the inquiries and other link and service information is not reachable with the second transceiver module 106. Between the modules there is a data bus 120, allowing data transfer between the two modules 104 and 106.

Figure 5:
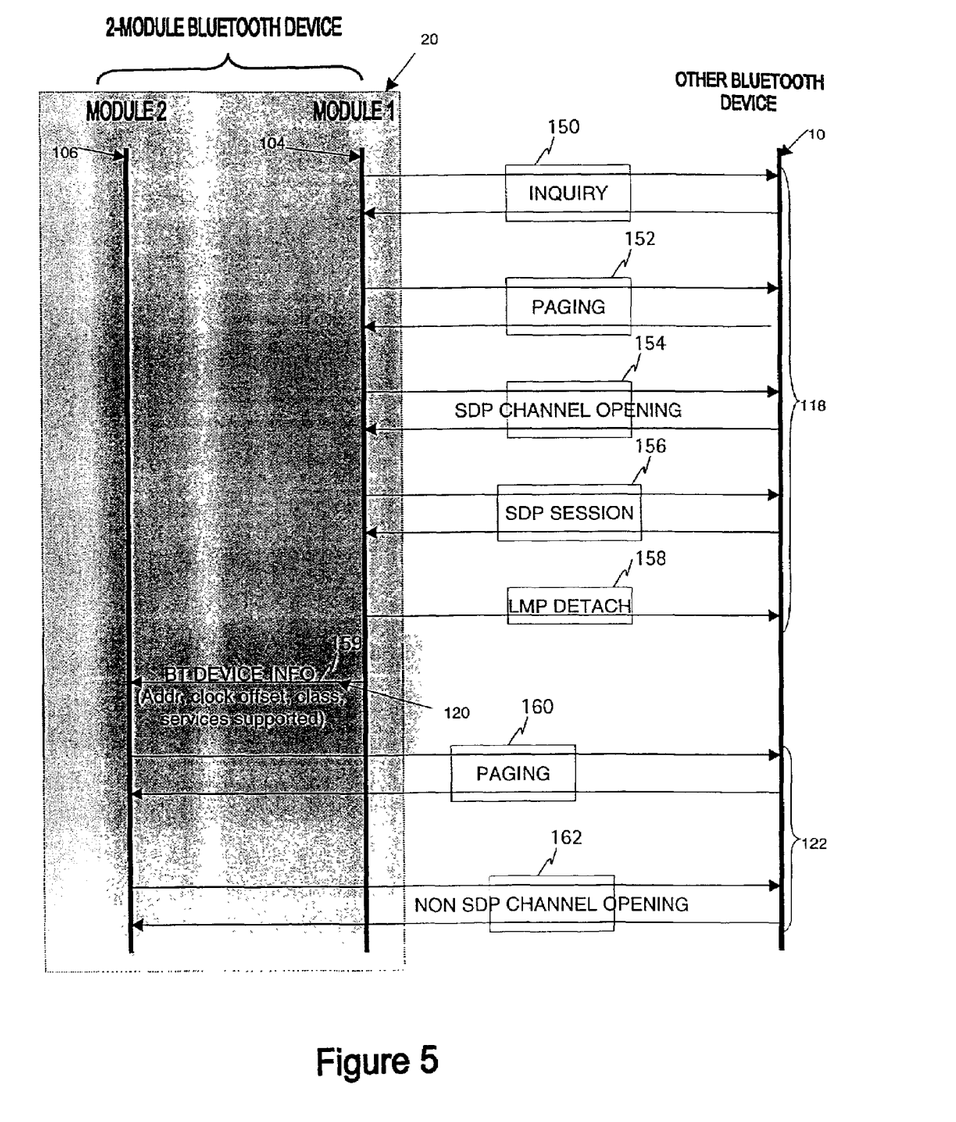
FIG. 5 is a chart illustrating the flow of operations between a Bluetooth access point having two separate Bluetooth modules integrated in it initiating the procedure and a Bluetooth enabled user terminal.

FIG. 5 illustrates one embodiment on how a two module Bluetooth device system would operate. The fixed device 20 (having two separate Bluetooth modules) takes the initiative and regularly performs inquiries to discover surrounding Bluetooth terminal devices 10. During the first phase of the process, the Bluetooth module one 104 and the other Bluetooth enabled user terminal device 10 form a first Bluetooth connection thus form a piconet. There are following steps in forming a piconet: As known from Bluetooth first the inquiries 150 are executed for establishing a connection and after successful completion of inquiries, paging 152 is activated. After paging the SDP channel is opened 154 and the SDP (Service Discovery Protocol) session can start 156. All necessary information of the other Bluetooth enabled device 10 is gathered to the Bluetooth module one 104 comprising but not limited e.g. other Bluetooth devices baseband address, clock offset information, Bluetooth class of the other Bluetooth device and supported services information of the device 10. After the information is gathered, the information can be transferred from Bluetooth module one 104 to Bluetooth module two 106 via the data bus 120 between the modules 104 and 106. Bluetooth module two 106 sends back a confirmation of the received information and after that, the Bluetooth module one 104 sends an LMP (Link Management Protocol) detach 158 that terminates the session between the fixed device 20 and the other Bluetooth enabled device 10 and then sends the information it received to the Bluetooth module two 106 (signal 159). After that, the Bluetooth module two 106 can initiate paging 160 of the specified Bluetooth enabled device 10 to form a piconet between the device 10 and itself 20. After paging is completed a new, non-SDP nature channel is opened up (162). Available channels in the Bluetooth protocol architecture are illustrated and can be found more thoroughly in the Bluetooth specifications.

Figure 6:
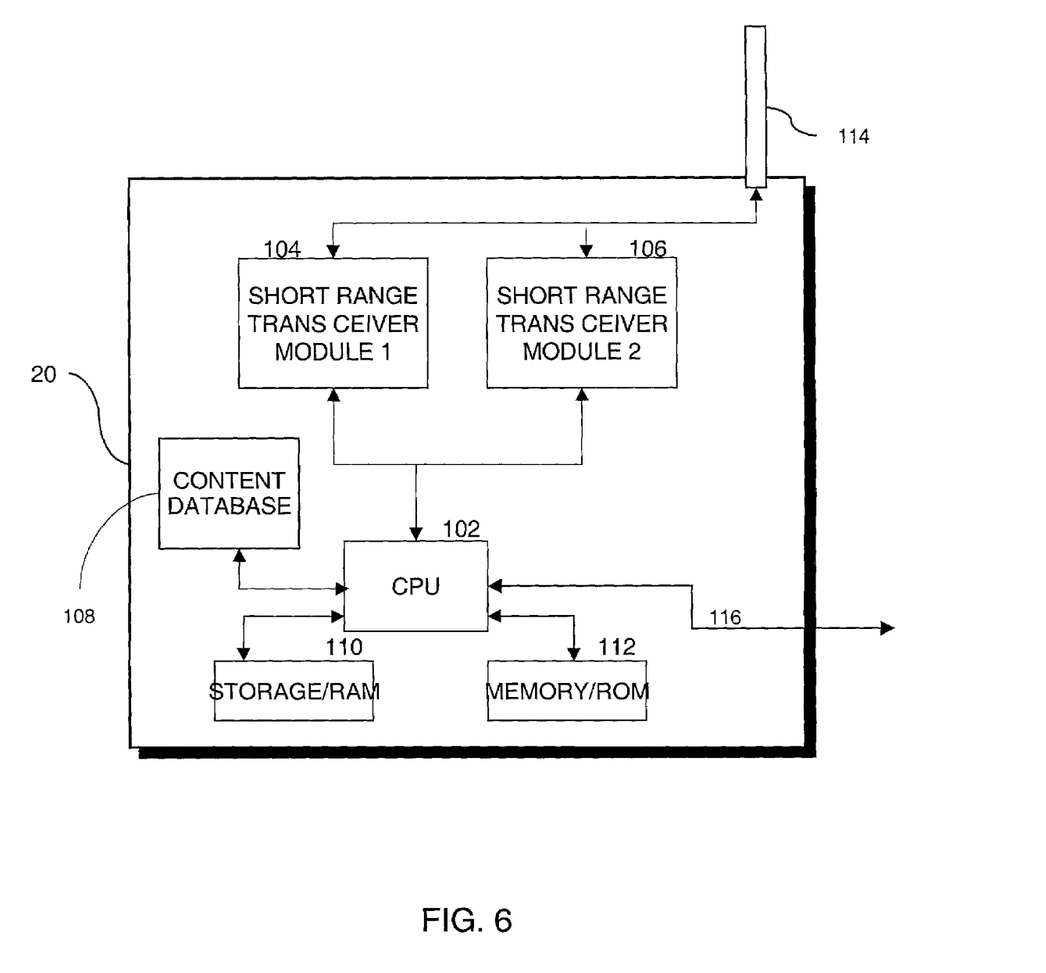
FIG. 6 illustrates an embodiment of the invention illustrating the structure of an access point having two Bluetooth transceiver modules integrated in it.

FIG. 6 discloses an embodiment of a kiosk device representing an access point 20 of this invention and being used for selling electronic content. The access point comprises of two independent short range transceiver modules 104, 106, a CPU 102, RAM storage 110 and ROM memory 112. A content database 108 for storing service related electronic content (to provide(sell) is an integrated part of the kiosk device. Also, there might be a connection 116, known to persons skilled in the art, to other networks, such as Internet. The short range communication is established by the short range transceiver modules 104 and 106 through a short-range antenna 114.

The CPU 102 controls the functions of the access point, including dynamic control of what function the first transceiver 104 and the second transceiver 106, respectively, performs, i.e. access communication (for establishing a connection) or communication of user data (over an established connection). This dynamic control can be implemented by a certain algorithm according to which the function of an access point is switched between the two functionalities. One way of implementing the dynamic control is also by fuzzy logic, which intelligently follows the situation, and if communication starts to get congested it will e.g. reduce access communication and increase user data communication.

Figure 8A:
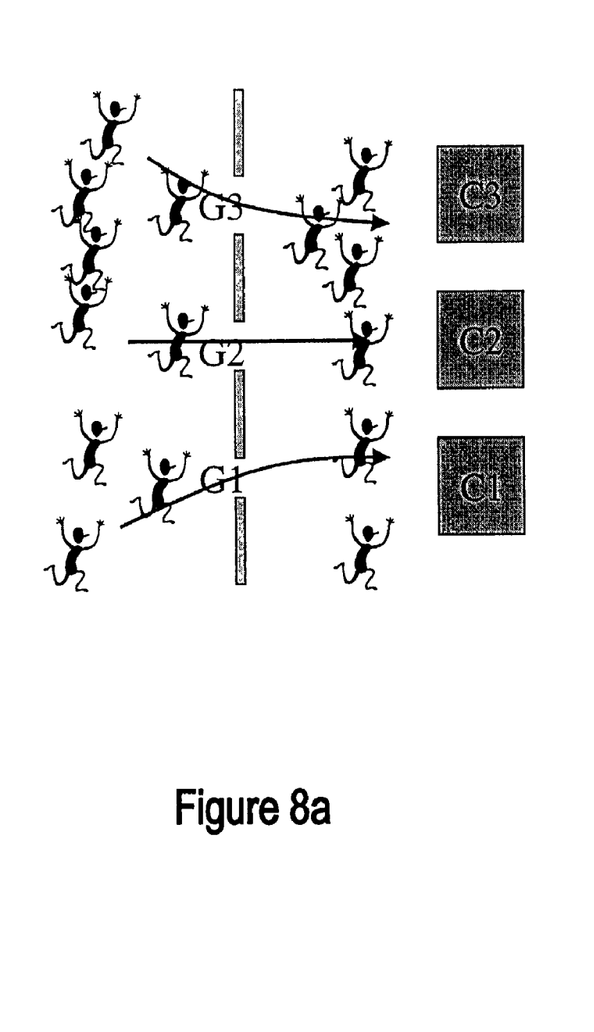
FIGS. 8a and 8b illustrate the principle of dynamic control of the transceiver functionality.
Figure 8B:
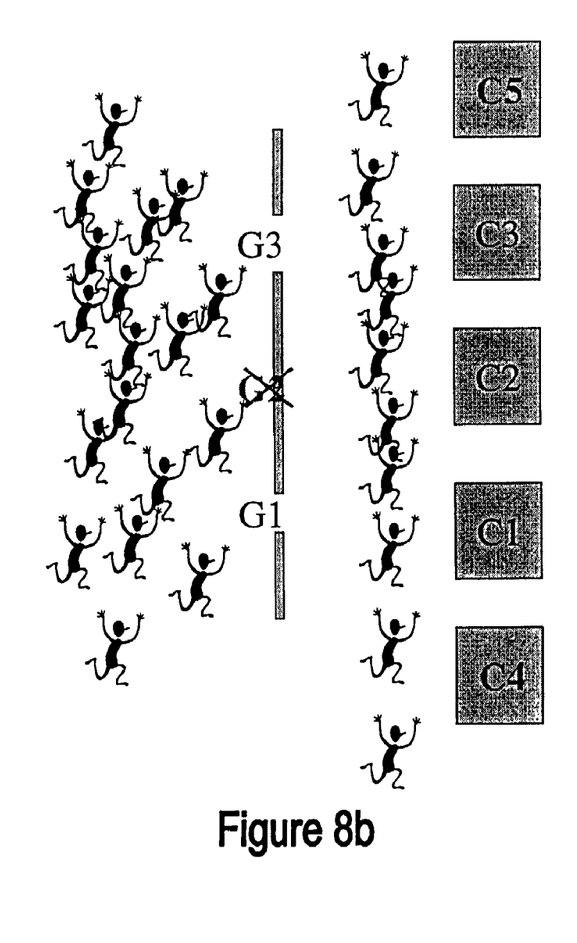

FIGS. 8a and 8b illustrates the principle of this dynamic control method, by analogy with the control of the access to a store. In FIG. 8a access is not limited (all the gates are used) and customers are served promptly by going to one of the counters C1–C3. Thus similarly when there is a certain number of channels in use in the access point for access communication and user data communication, then this number of channels can be kept stable as long as long as the number of mobile terminals within the access point is such that it can smoothly handle all access related communication and user data communication. In FIG. 8b, the number of users trying to get in and already in the shop has increased. The flow of customers is stopping at the counters that can not cope fast enough any more. In order to improve the situation, more counters C1–C5 are activated (i.e. counters C4 and C5 have been opened) while some of the gates G1–G3 are closed (i.e. gate G2 is closed). Less customers can come in, and the handling of those already in is speeded up. Thus, in order to cope with the increase in the number of customers already in the store or trying to get in, access to the store is limited (one gate has been closed) and handling of the customers has been speeded up (more counters are open). Thus similarly number of channels in use in the access point for access communication can be reduced and the number of channels in use for user data communication can be increased within the access point if the number of user terminals within the access point coverage area becomes so high that the access point can no longer smoothly handle all user data communication otherwise. The change of number of channels can thus be made by changing the whole functionality of an access point transceiver from access related communication to user data communication. The change of number of channels can also be made by changing the number of an access point transceiver is using for the different functions, i.e. by decreasing channels a particular transceiver is using for access related communication and increasing the number of channels for that transceiver correspondingly for user data communication.

Figure 9A:
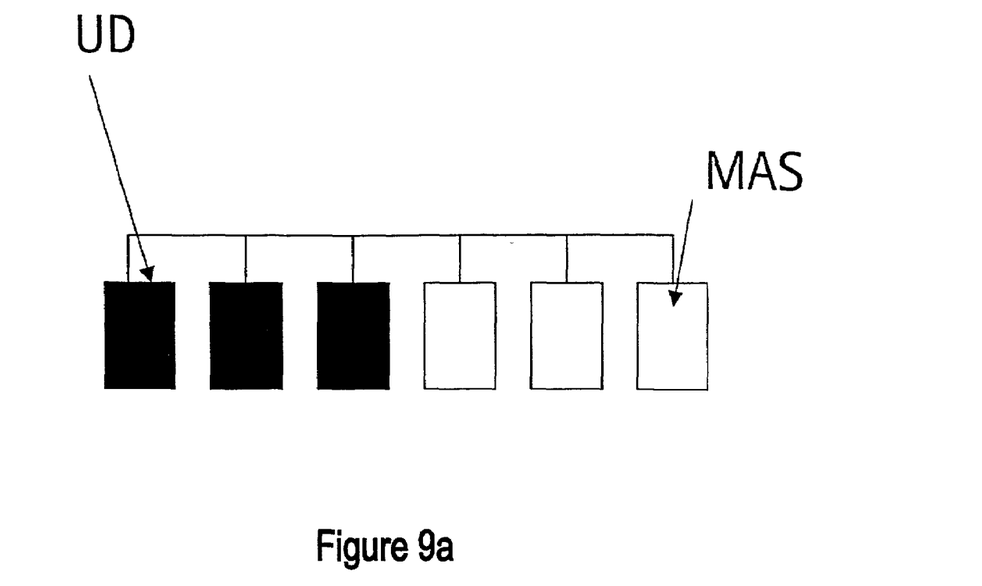
FIGS. 9a and 9b illustrate the dynamic control by division of user data modules and medium access modules in the access point.
Figure 9B:
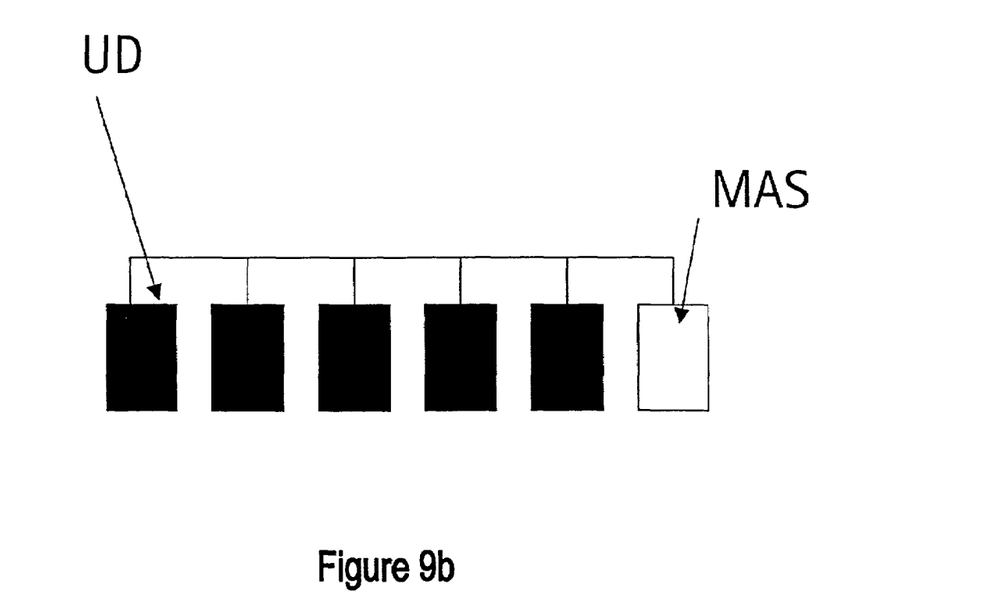

For further illustration FIG. 9a shows a normal load configuration where three out of six transceiver modules are assigned as user data modules UD and the other where three transceiver modules are assigned as medium access modules MAS so that access to the system is fast and download time is satisfactory. The medium access module MAS controls the access to the system by performing inquiries and SDP queries and forwarding the information to the user data module UD. The user data module UD is dedicated to the delivery of user data, after inquiry, paging and SDP inquiry has been performed by a MAS module. FIG. 9b illustrates a heavy load configuration where less modules (only one out of six) are used as MAS modules so that the number of new devices that access the system be reduced. More modules (five modules) are used as UD modules to serve better the devices that have already entered the system.

Figure 10:
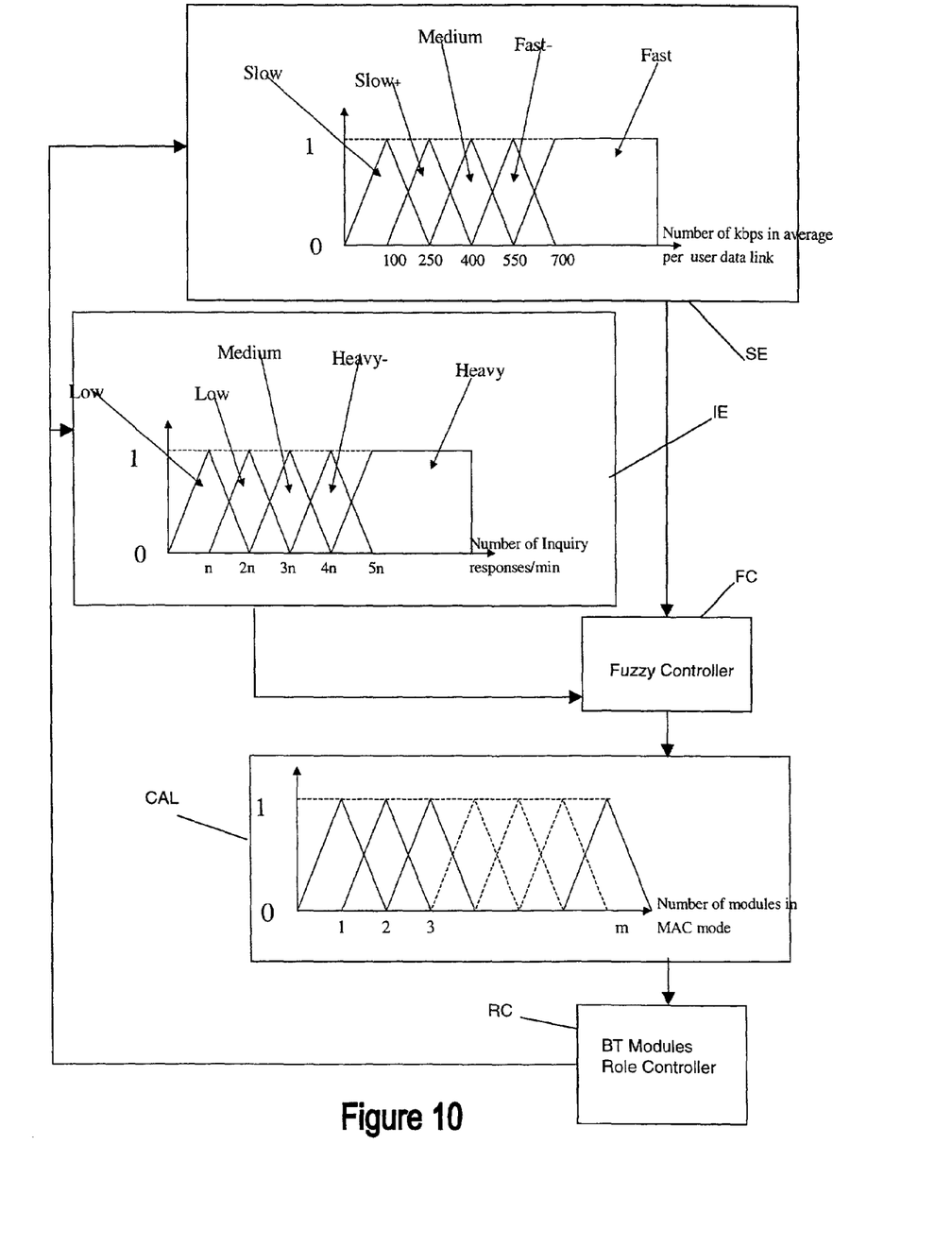
FIG. 10 illustrates a functional block diagram of implementation of the dynamic control according to the invention by utilisation of fuzzy logic.

FIG. 10 illustrates how the input parameters for a fuzzy logic controller can be modeled. To model exactly the behaviour of a Bluetooth access point, parameters such as the speed of change in the number of devices connected to the access point, the quality of reception should be considered. Fuzzy logic can be used for modeling this type of control. The logic can be implemented by programming a processor, such as a DSP or CPU 102 (shown in FIG. 6), to perform the functionalities of a computer program. This can be done by a functional block diagram illustrated in FIG. 10. A speed estimation block SE keeps track of transfer rate (kbps) of user data in the access point (i.e. in communication with the user terminals. The inquiry estimation block IE keeps track of the number of inquiry responses per minute in the access point. Both of these numbers are fed into a fuzzy control block FC which performs a calculation according to calculation block CAL, which calculates the necessary or optimum relationship between user data communication and medium access communication. This information is fed to a role controlling block RC which controls the operation of the transceivers accordingly (i.e. the CPU 102 performs the control).

The information from the SE and IE blocks can be utilised for logging and analysing the interactions between and access point and wireless user terminals. Especially by keeping track of the medium access communication, it is possible to calculate crowd and human traffic patterns within the access point, and by doing the same in all access points in a certain geographical area the calculate crowd and human traffic patterns can be calculated for that particular geographical area. This allows real-time study and analysis of crowd and traffic patterns without obtrusive intervention of people in the geographical area. This can provide the operators of other automated systems with queues and bottlenecks warnings when too many people are within a particular geographical area. The tracked information may be related to the current zone population, or the historical statistics of the zone may be aggregated and analysed later on. The generation of useful events, based upon rules applied to the analysed data may be passed on to $3^{rd}$ party systems such as alarms, physical alarms etc. Thus the control of FIG. 10 may be utilised in the CPU 102 for creating this kind of statistical information. For a single access point the statistical information can be created in the fuzzy control block FC or in the calculation block CAL. However, for a geographical area of several access points the information from the different access points is gathered in a central computer that calculates the overall statistical information (e.g. in computer 30 or 50 in FIG. 1, whereby a service provider 50 could provide the statistical information as a service).

Looking at the operation of FIG. 10 suppose that m is the number of modules in the medium access control mode, while M−m is the number of modules dedicated to user data transport. The m modules regularly perform Bluetooth inquiries, pages and SDP inquiries while the M−m remaining modules are used to upload content to the various devices that are connected to the Access Point. The parameter m can be adjusted and take values between 1 and M−1. The input parameters to the Fuzzy Control block are the performance (directly related to the average throughput available for devices doing content downloading) from block SE and the load (directly linked to the number of new devices discovered by the medium access dedicated modules) from block IE. Performance and load are mapped in fuzzy controller block FC and calculated in calculation block CAL. The output is modeled using a fuzzy mapping. A set of fuzzy rules govern the controller. The output of the calculation CAL is directly used by the modules role controller RC that regulates the assignment of each module to one of the 2 possible roles (medium access control or user data transport).

The dynamic control of transceiver functionalities of an access point can also be implemented by other smart algorithm than just fuzzy control logic that has been described above. The dynamic control optimizes the capacity of an access point and helps avoid overflows due to a sudden increase in wireless devices accessing the access point.

Figure 7:
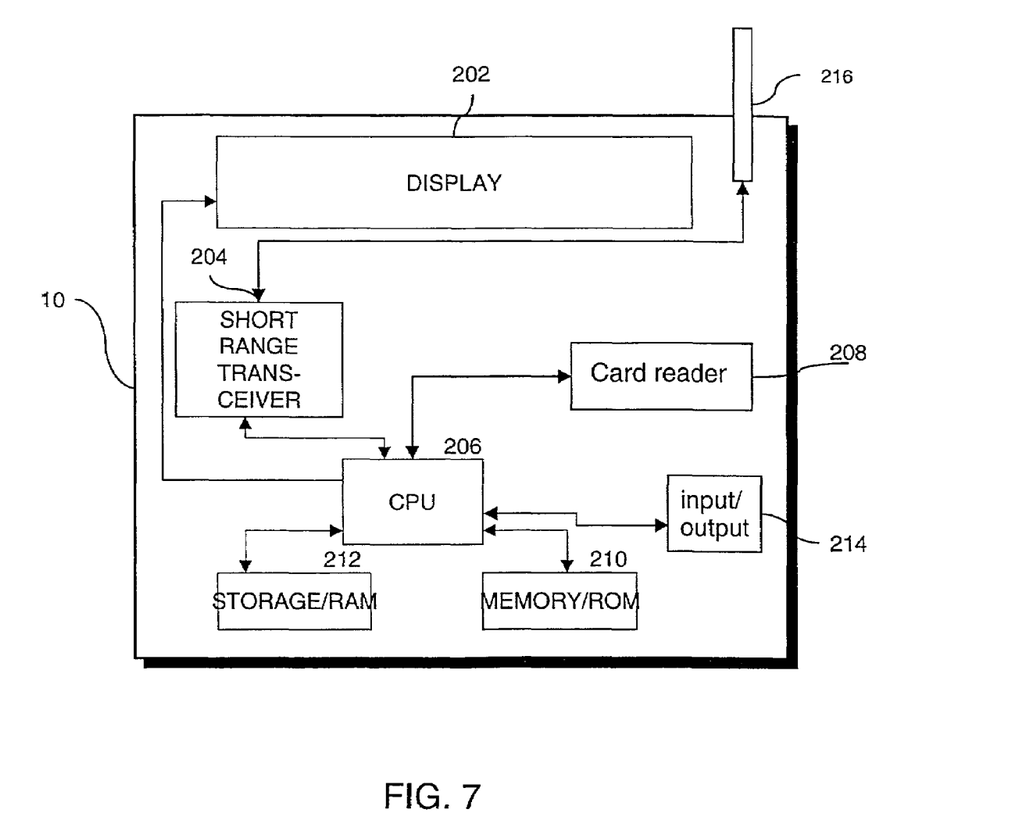
FIG. 7 illustrates an embodiment of a wireless user terminal according to the invention.

FIG. 7 illustrates one embodiment of a wireless terminal 10 capable of communicating with an access point. The terminal comprises a short-range transceiver 204 (such as Bluetooth transceiver) with an antenna 216, a CPU unit 206, RAM storage 212, ROM memory 210, input/output unit 214 and a display 202 for viewing content. In the terminal, there also might be a card reader 208 for reading information of a smart card.

Thus, while above have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the scope of the invention. For example, it is expressly intended that all combinations of those elements and/or method steps which perform substantially the same function in substantially the same way to achieve the same results are within the scope of this invention. For example even if antennae 114, 216 in FIGS. 6 and 7 are drawn as striking out of the devices 10 and 20, in practice an antenna of a Bluetooth transceiver would preferably be an internal antenna within the casing of the devices 10, 20. Moreover, it should be recognised that structures and/or elements and/or method steps shown and/or described in connection with any disclosed form or embodiment of the invention may be incorporated an any other disclosed or described or suggested form or embodiment as a general matter of design choice.

The invention claimed is:

1. A method of communicating between an access point of a short range rf network and a user terminal of the short range rf network, wherein the method comprises:
   operating a first short range rf transceiver at the access point for access communication with a user terminal for communicating information relating to establishment of a connection with the user terminal, and
   operating a second short range rf transceiver at the access point for user data communication for communicating data with the user terminal relating to the established connection with the user terminal.

2. A method according to claim 1, wherein the method comprises transferring the information relating to the establishment of a connection from the first transceiver to the second transceiver before communicating data with the second transceiver.

3. A method according to claim 2, wherein the method comprises establishing a communication bus between the first and the second transceiver and transferring the information relating to the establishment of a connection over said communication bus.

4. A method according to claim 2 or 3, wherein the information relating to the establishment of a connection comprises identification information of the user terminal.

5. A method according to claim 2, wherein the information relating to the establishment of a connection comprises the baseband address of the user terminal, clock offset information informing the offset in the clock between the access point and the user terminal, and information on which services are supported by the user terminal.

6. A method according to claim 1, wherein the method comprises
   establishing a first communication link between the first transceiver and the user terminal, and communicating the information relating to the establishment of a connection with the user terminal over the first communication link, and
   establishing a second communication link between the second transceiver and the user terminal, and communicating data with the user terminal over the second communication link.

7. A method according to claim 1, wherein the communication of information for the establishment of a connection with the user terminal comprises inquiries.

8. A method according to claim 1, wherein the method comprises
   disconnecting the connection between the first transceiver and the user terminal before communicating data between the second transceiver and the user terminal.

9. A method according to claim 1, wherein the method comprises
   discovering the user terminal having entered the coverage area of the access point, and only thereafter using the first short range rf transceiver at the access point for communication with the user terminal of information for establishing the connection with the user terminal.

10. A method according to claim 1, wherein the access point is in connection with a content provider and the method comprises
    transferring content of the content provider via the access point to the user terminal by using the second transceiver.

11. A method according to claim 1, wherein the first and the second transceiver have different baseband addresses.

12. A method according to claim 1, wherein short range rf network utilises short range rf communication according to the Bluetooth standard.

13. A method according to claim 1, wherein the user terminal is one of a mobile phone capable of communicating also over a cellular phone network, a personal digital assistant, a gamepad, a browser and a computer.

14. A method according to claim 1, wherein the method comprises
    the access point performing access communication and data communication with a plurality of user terminals,
    detecting the load of access communication and user data communication at the access point, and
    dynamically controlling the first and the second transceivers to perform one of access communication and user data communication depending on the detected load of the respective communications.

15. A method according to claim 14, wherein the method comprises using more than two transceivers, and dynamically controlling the number of transceivers performing access communication and the number of transceivers performing user data communication depending on the detected load of the respective communications within the access point.

16. A method according to claim 14 or 15, wherein the method comprises each of the transceivers communicating over a plurality of channels, and dynamically controlling the number of channels that each of the first and the second transceivers use to perform one of access communication and user data communication depending on the detected load of the access point.

17. A method according to claim 16, wherein the method comprises detecting an increase in the number of user terminals being in communication with the access point, and in response thereto increasing the number of channels used for user data communication and decreasing the number of channels used for access communication.

18. A method according to claim 14, wherein the method comprises detecting an increase in the number of user terminals being in communication with the access point, and in response thereto increasing the number of transceivers used for user data communication and decreasing the number of transceivers used for access communication.

19. A method according to claim 14, wherein the method comprises the total number of short range rf transceivers in use being the total number of short range rf transceivers in the access point.

20. A method according to claim 14, wherein the dynamic control is based on fuzzy logic control.

21. A method according to claim 1, wherein the first transceiver is dedicated to inquiries and service database requests and is discoverable and connectable to other short range rf enabled devices.

22. A method according to claim 1, wherein the second transceiver is dedicated to user data transport and is non-discoverable and is non-connectable to other short range rf enabled devices.

23. A method according to claim 1, wherein the method comprises detecting the number of user terminals entering and leaving the access point coverage area, and using the number of user terminals for creation of statistical data.

24. A method according to claim 23, wherein the method comprises performing the detection via the access communication.

25. A method according to claim 1, wherein the method comprises detecting the rate of user data communicated within the access point within a certain period, and using the rate for creation of statistical data.

26. A short range rf communication system comprising an access point of a short range rf network and a user terminal of the short range rf network, wherein the access point comprises:

a first short range rf transceiver for access communication with a user terminal for communicating information in relation to establishment of a connection with the user terminal, and a second short range rf transceiver for user data communication for communicating data with the user terminal relating to the established connection with the user terminal.

27. A communication system according to claim 26, wherein the access point comprises means for transferring the information relating to the establishment of a connection from the first transceiver to the second transceiver before communicating data with the second transceiver.

28. A communication system according to claim 27, wherein the access point comprises a communication bus between the first and the second transceiver for transferring information relating to the establishment of a connection from the first transceiver to the second transceiver.

29. A communication system according to claim 26, wherein the information relating to the establishment of a connection comprises identification information of the user terminal.

30. A communication system according to claim 26, wherein the system comprises means for disconnecting the connection between the first transceiver and the user terminal before communicating data between the second transceiver and the user terminal.

31. A communication system according to claim 26, wherein the system comprises means for discovering when the user terminal enters the coverage area of the access point, and for initiating access communication in response to having discovered entrance of the coverage area by the user terminal.

32. A communication system according to claim 26, wherein the system further comprises a content provider being in functional connection with the access point, and means for transferring content of the content provider via the access point to the user terminal by using the second transceiver.

33. A communication system according to claim 26, wherein the first and the second transceiver have different baseband addresses.

34. A communication system according to claim 26, wherein the information relating to the establishment of a connection comprises the baseband address of the user terminal, clock offset information informing the offset in the clock between the access point and the user terminal, and information on which services are supported by the user terminal.

35. A communication system according to claim 26, wherein the system comprises means for short range rf communication according to the Bluetooth standard.

36. A communication system according to claim 26, wherein the user terminal is one of a mobile phone capable of communicating also over a cellular phone network, a personal digital assistant, a gamepad, a browser and a computer.

37. A communication system according to claim 26, wherein the first and second transceiver are adapted to perform access communication and user data communication with a plurality of user terminals, and the access point further comprises means for detecting the load of access communication and user data communication at the access point, and means for dynamically controlling the first and the second transceivers to perform one of access communication and user data communication depending on the detected load of the respective communications.

38. A communication system according to claim 37, wherein the access point comprises more than two transceivers, and means for dynamically controlling the number of transceivers performing access communication and the number of transceivers performing user data communication depending on the detected load of the respective communications within the access point.

39. A communication system according to claim 37, wherein each of the transceivers is adapted to communicate over a plurality of channels, and the access point comprises means for dynamically controlling the number of channels that each of the first and the second transceivers use to perform one of access communication and user data communication depending on the detected load of the access point.

40. A communication system according to claim 39, wherein the access point comprises means for detecting an increase in the number of user terminals being in communication with the access point, and means for in response to the detection of said increase, increasing the number of channels used for user data communication and decreasing the number of channels used for access communication.

41. A communication system according to claim 37, wherein the access point comprises means for detecting an increase in the number of user terminals being in communication with the access point, and means for in response to the detection of increase, increasing the number of transceivers used for user data communication and decreasing the number of transceivers used for access communication.

42. A communication system according to claim 26, wherein each transceiver comprises at least one Bluetooth chip for Bluetooth communication with other Bluetooth enabled devices.

43. A communication system according to claim 42, wherein the system further comprises means for detecting the number of user terminals entering and leaving the access point coverage area, and means for using the number of user terminals for creation of statistical data.

44. A communication system according to claim 43, wherein the system further comprises means for performing the detection via the access communication.

45. A communication system according to claim 26, wherein the system further comprises means for detecting the rate of user data communicated within the access point within a certain period, and means for using the rate for creation of statistical data.

46. An apparatus for short range rf communication with a user terminal, wherein the apparatus comprises:

a first short range rf transceiver for access communication with the user terminal for communicating information relating to establishment of a connection with the user terminal, and a second short range rf transceiver for user data communication for communicating data with the user terminal relating to the established connection with the user terminal.

47. An apparatus according to claim 46, wherein the apparatus is an access point of a short range rf communication system.

48. A computer program product embodied on a computer readable medium for communicating between an access point of a short range rf network and a user terminal of the short range rf network, the computer program product controlling a data-processing device to perform operating a first short range rf transceiver at the access point for access communication with a user terminal for communicating information relating to establishment of a connection with the user terminal, and operating a second short range rf transceiver at the access point for user data communication for communicating data with the user terminal relating to the established connection with the user terminal.

* * * * *